United States Patent [19]

Watanabe

[11] Patent Number: 4,702,628
[45] Date of Patent: Oct. 27, 1987

[54] ROLLER RETAINING ASSEMBLY

[75] Inventor: Hitoshi Watanabe, Mino, Japan

[73] Assignee: Nippon Thompson Co., Ltd., Tokyo, Japan

[21] Appl. No.: 836,021

[22] Filed: Mar. 4, 1986

[30] Foreign Application Priority Data

Mar. 5, 1985 [JP] Japan ............................. 60-30305[U]

[51] Int. Cl.[4] ............................................. F16C 33/46
[52] U.S. Cl. .................................................... 384/580
[58] Field of Search ................ 384/580, 575, 576, 578

[56] References Cited

U.S. PATENT DOCUMENTS 3,362,763  1/1968  Moynihan ........................... 384/580
3,802,754  4/1974  Pitner .................................. 384/580
3,992,764  11/1976 Serasio ................................ 384/575

Primary Examiner—Lenard A. Footland
Attorney, Agent, or Firm—Thomas S. MacDonald; Allan H. MacPherson; Paul J. Winters

[57] ABSTRACT

A roller retaining assembly for use in a roller bearing includes a retaining ring provided with a plurality of retainer windows arranged spaced apart one from another along the circumferential direction of the ring and a plurality of rollers each of which is received in an associated one of the plurality of retainer windows. The retainer window is generally rectangular in shape and it has a length and a width which are slightly larger than the length and the diameter of the roller, respectively. The retainer window is provided with a pair of retaining projections at the outer peripheral surface and also at the inner peripheral surface of the retainer ring located at the center in the axial direction of the retainer ring. The shortest distance between the pair of retaining projections is set to be smaller than the diameter of the roller so that the roller is confined in the retainer window at all times. With this structure, the roller is prevented from slipping away from the retainer window and also from being stuck in whatever orientation it may take within the retainer spring.

2 Claims, 6 Drawing Figures

ROLLER RETAINING ASSEMBLY

BACKGROUND OF THE INVENTION

1. Field of the Invention

This invention generally relates to a roller bearing, and, in particular, to a roller retaining assembly, including a retainer ring and a plurality of roller rotatably supported by the retainer ring, for use in a roller bearing.

2. Description of the Prior Art

A roller bearing typically includes a roller retaining assembly which comprises a plurality of rollers and a retainer for retaining the plurality of rollers rotatably. In a typical prior art roller retaining assembly, a retainer in the shape of a ring is provided with a plurality of retainer windows spaced apart from each other in the circumferential direction. And, each of the windows is so shaped to support the corresponding roller rotatably therein by supporting both ends of the roller. Such a structure, however, is rather difficult to manufacture. In particular, when the retainer ring is relatively thick, significant deformations of the retaining windows could result due to machining, so that accuracy tends to be poor. Besides, in the case where the rollers used are relatively shorter in length, they tend to be stuck in the windows, thereby hindering a proper bearing function.

SUMMARY OF THE INVENTION

In accordance with the present invention, there is provided a roller retaining assembly suitable for use in a roller bearing, which includes a plurality of rollers and a retainer ring provided with a plurality of retainer windows spaced apart from one another in the circumferential direction, wherein each of the retainer windows is slightly larger in length and width than the roller and side holding means is provided for holding the roller in the corresponding window by engaging the peripheral surface of the roller. In the preferred embodiment, the side holding means includes a pair of outer and inner projections, each of which is formed by caulking or causing a plastic deformation to part of the retainer ring so as to project generally inward of the window. In the most preferred embodiment, such plastically deformed projections are approximately located at the center of the window.

It is therefore a primary object of the present invention to obviate the disadvantages of the prior art as described above and to provide an improved roller retainer assembly for use in a roller bearing.

Another object of the present invention is to provide a roller retaining assembly high in accuracy, but easy and thus inexpensive to manufacture.

A further object of the present invention is to provide a roller retaining assembly suitable for use in a roller bearing, which allows the use of rollers selected from a wide range of diameter to height ratio.

Other objects, advantages and novel features of the present invention will become apparent from the following detailed description of the invention when considered in conjunction with the accompanying drawings.

DESCRIPTION OF THE PREFERRED EMBODIMENTS

Figure 1:
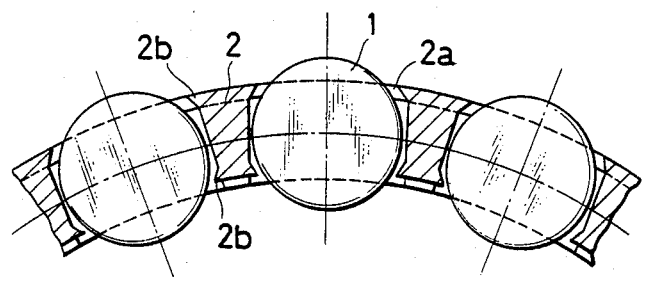
FIG. 1 is a schematic illustration showing a roller retaining assembly suitable for use in a roller bearing constructed in accordance with one embodiment of the present invention.
Figure 2:
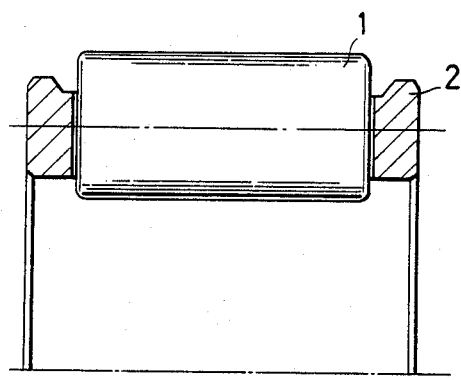
FIG. 2 is a schematic illustration showing the upper half of the axially cross-sectional section of the roller retaining assembly shown in FIG. 1.
Figure 3:
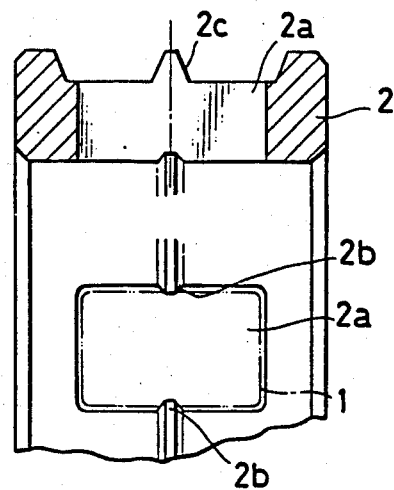
FIG. 3 is a fragmentary axial, cross-sectional view showing a retainer ring constituting part of the roller retaining assembly shown in FIG. 1.

Referring now to FIG. 1, there is schematically shown a roller retaining assembly particularly suitable for use in a roller bearing. As shown, the roller retaining assembly includes a plurality of rollers 1 having a particular diameter and length and a retainer ring 2 which is provided with a plurality of retainer windows 2a spaced apart one from another preferably at equal intervals in the circumferential direction. As shown in FIG. 3, the retainer windows 2a are all rectangular in shape and they are slightly larger in length and width than the rollers 1, so that the rollers 1 can move freely when placed in the respective windows 2a. In the illustrated embodiment, the retainer ring 2 has a thickness which is slightly smaller than the diameter of the rollers 1.

The outer peripheral surface of the retainer ring 2 is formed with a pair of circumferential outer grooves spaced apart from each other over a predetermined distance so that a central circumferential ridge 2c is defined therebetween. As a result, the outer peripheral surface of the retainer ring 2 presents a shape of the letter "W" when viewed in cross section as shown in FIG. 3. It should be noted that the distance between the outermost edges between the pair of circumferential outer grooves is larger than the length of the retainer windows 2a. This is critical in manufacturing the retainer ring 2 because it will facilitate the formation of the retainer windows 2a after forming the pair of circumferential outer grooves.

Also formed in the retainer ring 2 are a pair of upper retaining projections 2b, 2b and a pair of lower retaining projections 2b, 2b for each of the retainer windows 2a. That is, in the illustrated embodiment, the pair of upper projections 2b, 2b are formed as extensions of the central ridge 2c which project somewhat inwardly of the retainer window 2a from both sides. In the preferred embodiment, these retaining projections 2b, 2b are formed by caulking or causing a plastic deformation to the edge portions of the central ridge 2c. Similarly, the pair of bottom retaining projections 2b, 2b are formed to project somewhat inwardly of the retainer window 2a, and these bottom retaining projections 2b, 2b may also be preferably formed by causing a plastic deformation to part of the ring retainer, for example, by caulking. In the illustrated embodiment, the inner peripheral surface of the retainer ring 2 is formed with a central groove and end portions of the central groove are partly deformed, for example, by caulking to form the pair of bottom retaining projections 2b, 2b. If desired however, similarly with the outer peripheral surface of the retainer ring 2, another central ridge may be formed at the inner peripheral surface. Thus, there are formed four retaining projections 2b for each of the retainer windows 2a and these retaining projections 2b are located approximately at the center of the window 2a in the axial direction. The shortest distance between the paired retaining projections 2b, 2b must be set to be smaller than the diameter of the roller 2a, so that the roller 2a may be retained in position as located in the corresponding retaining window 2a.

Figure 4:
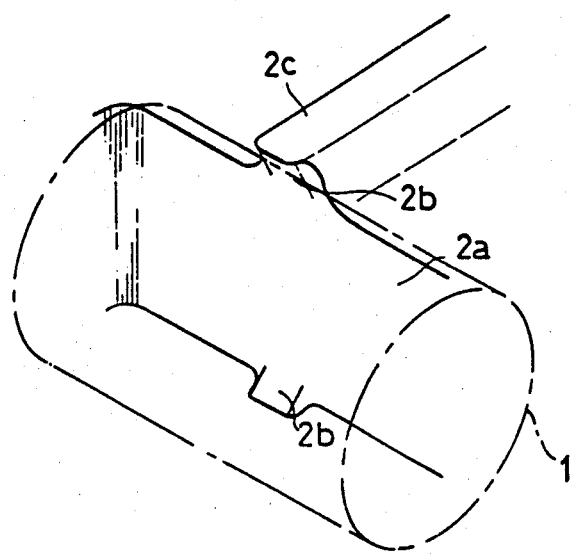
FIG. 4 is a schematic, perspective view showing the structure of the main portion of the retainer ring shown in FIG. 3.

FIG. 4 shows in detail how the upper and lower retaining projections 2b, 2b are formed for the retainer window 2a. As shown, the retaining projection 2b is wedge-shaped and it has an inclined retaining surface which extends upwardly from the side wall of the retainer window 2a aslant toward the retainer window 2a. Thus, as will be described more in detail later, the roller 1 will come into contact with this inclined retaining surface when it moves within the retainer window 2a so that the roller 1 is prevented from moving out of the retainer window 2a.

Figure 5:
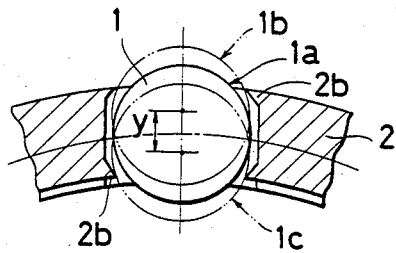
FIGS. 5 and 6 are schematic illustrations which are useful for explaining the roller retaining function in the embodiment shown in FIGS. 1 and 2.

Now, referring to FIGS. 5 and 6, the operation of the present roller retaining assembly will be described. As described above, there is provided a pair of top retaining projections 2b, 2b at the outer edge of the retainer window 2a and a pair of bottom retaining projections 2b, 2b at the inner edge of the retainer window 2a, and the shortest distance between the paired retaining edges 2b, 2b is smaller than the diameter of the roller 1, so that there is an outer limit and an inner limit for the roller 1 to move in the retainer window 2a. The position of the roller 1 when it is located at its outer limit with the roller 1 being in contact with the pair of outer retaining projections 2b, 2b is shown by the phantom line 1b in FIG. 5; whereas, the position of the roller 1 when it is located at its inner limit with the roller being in contact with the pair of inner retaining projections 2b, 2b is shown by the phantom line 1c. Thus, the roller 1 may move radially with respect to the retainer ring 2 over a distance y, which is indicated as the center-to-center distance when the roller 1 moves between the outer and inner limits within the retainer window 2a.

Figure 6:
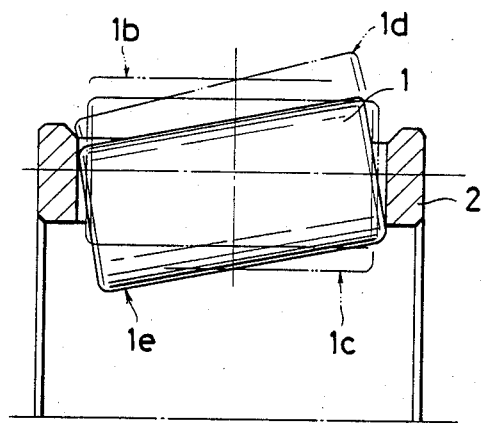

FIG. 6 shows how the roller 1 is prevented from slipping away from the corresponding retainer window 2a at its end portions. That is, as described previously, the retainer window 2a is dimensioned to be slightly longer than the length of the roller 1, so that there is a gap between the roller 1 and the retainer window 2 in the axial direction of the roller 1. As a result, the roller 1 may be inclined with respect to the central axis of the retainer ring 2 as shown in FIG. 6. However, in the preferred embodiment, since the gap between the roller 1 and the retainer window 2a in the axial direction of the roller 1 is so set that the periphery of both end surfaces of the roller 1 does not come into contact with the side or end wall of the retainer window, the roller 1 is prevented from being stuck in the retainer window 2a. Described more in detail, the position of the roller 1 when it is located at its lowermost position as being inclined with respect to the axial direction of the retainer ring 2 is indicated by the solid line 1e, and, under this condition, the periphery of the left end surface of the roller 1 is in contact with the side wall of the retainer window 2a; on the other hand, the periphery of the right end surface of the roller 1 is not in contact with the side wall of the retainer window 2a. In other words, the periphery of the left end surface of the roller 1 is in contact with the side wall of the retainer window 2a and the right end surface of the roller 1 is in contact with the right bottom edge of the retainer window 2a.

Similarly, the position of the roller 1 when it is located at its uppermost position as being inclined with respect to the central axis of the retainer ring 2 is indicated by the phantom line 1d. In this case, the periphery of the right end surface of the roller 1 is in contact with the side wall of the retainer window 2a, whereas the periphery of the left end surface of the roller 1 is not in contact with the side wall of the retainer window 2a, and, instead, the left end surface of the roller 1 is in contact with the left upper edge of the retainer window 2a. It should also be noted that the positions of the outer and inner limits 1b and 1c for the roller 1 with respect to the retainer window 2a are also indicated in FIG. 6.

As described above, since the gap between the roller 1 and the associated retainer window 2a is set in a particular manner, the roller 1 is prevented from being inclined excessively and from being stuck in the retainer window 2a. Such a structure insures that the roller 1 may be properly retained and freely movable in the associated window 2a at all times. Most preferably, the roller 1 has a size ratio between its axial length and diameter such that the axial length is at least approximately twice the diameter.

As described in detail above, in accordance with the present invention, the roller 1 is securely retained at three points, i.e., both ends of the retainer window 2a and the central retaining projection and, at its outer and inner limits, so that the roller 1 may be retained in a freely movable condition within limits at all times. The shape of the retainer window 2a is extremely simple, and, thus, it facilitates manufacture. Since the overall structure is simple, the present roller retaining assembly can be manufactured with ease and at high accuracy.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A roller retaining assembly for use in a roller bearing, comprising:
    retaining means generally cylindrical in shape and including a plurality of retainer windows generally rectangular in shape and arranged spaced apart one from another in a circumferential direction of the cylindrical retaining means, said retaining means including a pair of outer retaining projections and a pair of inner retaining projections, each of said projections projecting from a wide wall of and associated one of said retainer windows;
    a plurality of rollers each of which is received in the associated one of said plurality of retainer windows;
    whereby each of said plurality of rollers has a diameter and a length which is slightly smaller than a width and a length of said associated retainer window, and the diameter of said roller is greater than a shortest distance between the pair of outer retaining projections and also between the pair of inner retaining projections;
    wherein said retaining means includes a retainer ring which is provided with a central ridge at an outer peripheral surface thereof between the two adjacent retainer windows, and both ends of said central ridge are plastically deformed to define said outer retaining projections which project generally inwardly of said retaining window, and said retainer ring has a thickness which is slightly smaller than the diameter of said rollers; and wherein said outer peripheral surface of said retainer ring is provided with a pair of grooves spaced apart from each other in the axial direction of said retaining ring, thereby forming said central ridge between said pair of grooves; and wherein a gap between said roller and said retainer window in an axial direction of said roller is such that, when said roller is located at its outermost or innermost position as being inclined with respect to the axial direction of said retainer ring, a periphery of one end surface of said roller is in contact with a side wall of said retainer window and a periphery of the other end of said roller is not in contact with a side wall of said retainer window.

2. The assembly of claim 1 wherein the axial length of each of said rollers is at least approximately twice the diameter thereof.

* * * * *